United States Patent [19]
Miyamoto

[11] Patent Number: 6,154,617
[45] Date of Patent: *Nov. 28, 2000

[54] CAMERA TO REDUCE EFFECT OF MAGNETIC FLUX EMITTED FROM DRIVE MOTOR

[75] Inventor: Hidenori Miyamoto, Urayasu, Japan

[73] Assignee: Nikon Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/882,346

[22] Filed: Jun. 25, 1997

[30] Foreign Application Priority Data

Jun. 25, 1996 [JP] Japan .................................. 8-164183

[51] Int. Cl.⁷ .................................................. G03B 17/24
[52] U.S. Cl. .......................................................... 396/319
[58] Field of Search .................................. 396/535, 310, 396/311, 319, 320, 155, 281

[56] References Cited

U.S. PATENT DOCUMENTS

| | | | |
|---|---|---|---|
| 5,155,511 | 10/1992 | Tamamura | 396/319 |
| 5,410,378 | 4/1995 | Tasaka et al. | 396/155 |
| 5,432,570 | 7/1995 | Uuda et al. | 396/319 |
| 5,701,531 | 12/1997 | Tanaka et al. | 396/319 |
| 5,884,112 | 3/1999 | Funahashi et al. | 396/539 |
| 5,887,206 | 3/1999 | Sasaki et al. | 396/319 |
| 5,930,537 | 7/1999 | Okuno et al. | 396/281 |
| 5,995,769 | 11/1999 | Kumakura | 396/210 |

OTHER PUBLICATIONS

Camera System and Film Take–up Motor for it, Feb. 12, 1993 of JP 5–34798, Fuji Photo Film Co Ltd, Aug. 1, 1991, Nobuoru Komori.
Patent Abstracts of Japan, Magnetic Recording and Reproducing Device for Photographic Film, May 19, 1995 of JP 07128724, Konica Corp, Apr. 11, 1993, Kikukawa Shozo, et al.
Patent Abstracts of Japan, Camera Using Film with Magnetic Recording Part, Apr. 8, 1995 of JP 07199328, Olympus Optical Co. Ltd, Oct. 1, 1994, Ando Hiroyuki.
Patent Abstracts of Japan, Magnetic Recorder for Camera, Aug. 18, 1995 of JP 07219021, Fuji Photo Film Co Ltd, Jan. 28, 1994, Sasaki Wataru.

*Primary Examiner*—Russell Adams
*Assistant Examiner*—Christopher E. Mahoney

[57] ABSTRACT

A camera records magnetic data on magnetically recordable film and reduces the effect of magnetic flux emitted from a drive motor of the camera. The drive motor leaks magnetic flux and is located inside a camera windup spool. The magnetic flux is generated from a brush side of the drive motor. A readout head reads out magnetic data from the photographic film and is located between a cartridge compartment and a picture frame of the camera. Accordingly, the readout head is located in a position apart from the brush side of the drive motor thereby suppressing the mixing of magnetic flux generated by the drive motor with magnetic data which has been read out by the magnetic head.

15 Claims, 6 Drawing Sheets

CAMERA TO REDUCE EFFECT OF MAGNETIC FLUX EMITTED FROM DRIVE MOTOR

CROSS-REFERENCE TO RELATED APPLICATIONS

This application is based upon and claims priority of Japanese Patent Application No. 08-164183 filed Jun. 25, 1996, the contents being incorporated herein by reference.

BACKGROUND OF THE INVENTION

The present invention relates to a camera which is capable of recording magnetic data on magnetically recordable photographic film. More particularly, the present invention relates to a camera which reduces the effect of magnetic flux emitted from a camera drive motor on a magnetic recording region of magnetically recordable photographic film.

Cameras are known which are capable of recording photographic data such as a date of photography, an exposure value, and the like in magnetic recording regions coated on photographic film. The magnetic recording regions are conventionally located either above or below a plurality of photographic frames in a one to one correspondence. The photographic data which has been recorded on the photographic film is later read out at a photo lab during processing and is, for example, printed as characters on a back side of developed photographic prints.

In this kind of camera, a drive motor is conventionally disposed within a windup spool which winds up photographic film. The photographic film is then advanced and wound by driving the drive motor. When magnetically recordable photographic film is used in such a camera, there is a risk that magnetic data which has been recorded on the photographic film will be corrupted through leakage of magnetic flux from a brush side of the drive motor. A camera has been proposed in Japanese Laid-Open Patent Publication JP-A 5-34798 which reduces the amount of leakage of magnetic flux from a windup spool which houses a drive motor. In Japanese Laid-Open Patent Publication JP-A-7-199328, a motor is disposed within a film winding spool. A brush side of the drive motor is disposed towards the top of the camera while a recording head for recording magnetic data onto photographic film is located towards the bottom side of the camera and below the drive motor.

In magnetically recordable photographic film, the thickness of a magnetic recording region coated on the photographic film surface is thinner in comparison with a coating on other types of film such as audio tape or video tape. This allows the photographic film to be transparent. The amount of magnetic material coated on the photographic film is on the order of $\frac{1}{50}$–$\frac{1}{100}$ in comparison with audio tape or video tape. Accordingly, it is necessary to amplify the magnetic data which is read out from the photographic film with an amplifier having a gain of 50–100. However, noise contained in the recorded magnetic data also becomes amplified when the magnetic data is read from photographic film. Accordingly, in a camera such as that disclosed in the above-mentioned JP-A-7-199328, it is not sufficient to simply locate the magnetic head on an opposite side of a drive motor from the brush side of the drive motor.

Moreover a camera having magnetic shielding, such as that disclosed in the above-mentioned JP-A-7-34798, also encounters problems. When the magnetic shielding is disposed in the windup spool to suppress the leakage of magnetic flux, the camera becomes bulky and associated costs increase.

BRIEF SUMMARY OF THE INVENTION

It is therefore an object of the present invention to reduce the effects of leakage of magnetic flux from a drive motor in a camera without increasing the size of the camera.

It is another object of the present invention to position an unexposed frame of partially exposed photographic film during rewinding without reversing the photographic film.

It is a further object of the present invention to amplify magnetic data which has been stored on photographic film while suppressing the mixing of magnetic noise generated by a brush side of a camera drive motor.

It is a further object of the invention to amplify magnetic data which has been stored on photographic film while suppressing the mixing of magnetic noise generated by a DC/DC converter used to charge a camera flash device.

It is still a further object of the present invention to suppress the mixing of noise due to electromagnetic waves generated from a liquid crystal display and magnetic data read from photographic film.

It is yet another object of the present invention to shield the leakage of magnetic flux generated by a camera drive motor by molding a compartment housing of the drive motor with resin containing magnetically shielding fibers.

It is a further object of the present invention to readout magnetic data from photographic film in a different direction of magnetic flux from the direction of magnetic flux generated by a camera drive motor.

Objects of the invention are achieved by a camera, including a cartridge compartment to receive a photographic film cartridge housing magnetically recordable photographic film; a windup spool to wind up the photographic film; a drive motor disposed within the windup spool and providing drive to the windup spool; a picture frame to define an exposed portion of the photographic film and disposed between the cartridge compartment and the windup spool; and a magnetic head to read out magnetic data which has been recorded on the photographic film, wherein the magnetic head is disposed on an opposite side of the picture frame from the windup spool.

Further objects of the invention are achieved by a camera to expose photographic film and communicate photographic data with a magnetic storage region on the photographic film, including a drive motor to drive a windup spool to thereby wind the photographic film; a picture frame to expose the photographic film, wherein the picture frame has a vertical axis; and a magnetic head to read out magnetic data which has been recorded in the magnetic storage region of the photographic film, wherein the magnetic head is disposed on an opposite side of the vertical axis of the picture frame from the windup spool.

Moreover, objects of the invention are achieved by a camera to expose photographic film and communicate photographic data with a magnetic storage region on the photographic film, including a DC/DC converter to step up voltage within the camera, wherein the DC/DC converter emits magnetic flux during operation; a picture frame to expose the photographic film, wherein the picture frame has a vertical axis; and a magnetic head to read out magnetic data which has been recorded in the magnetic storage region of the photographic film, wherein the magnetic head is disposed on an opposite side of the vertical axis of the picture frame from the DC/DC converter.

Further objects of the invention are achieved by a camera, including a cartridge compartment to receive a photographic film cartridge housing magnetically recordable photographic film; a windup spool to wind up the photographic film; a drive motor having a brush side and disposed within the windup spool to provide drive to the windup spool; a picture frame to define an exposed portion of the photographic film and disposed between the cartridge compartment and the windup spool; a magnetic head to read out magnetic data which has been recorded on the photographic film; an amplifier to amplify the magnetic data which has been read out of the magnetic head and disposed on an opposite side of the picture frame from the windup spool; and a DC/DC converter to step up voltage within the camera, wherein the DC/DC converter is disposed adjacent to the brush side of the drive motor, and wherein the magnetic head is disposed on an opposite side of the picture frame from the windup spool.

BRIEF DESCRIPTION OF THE DRAWINGS

These and other objects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Figure 1:
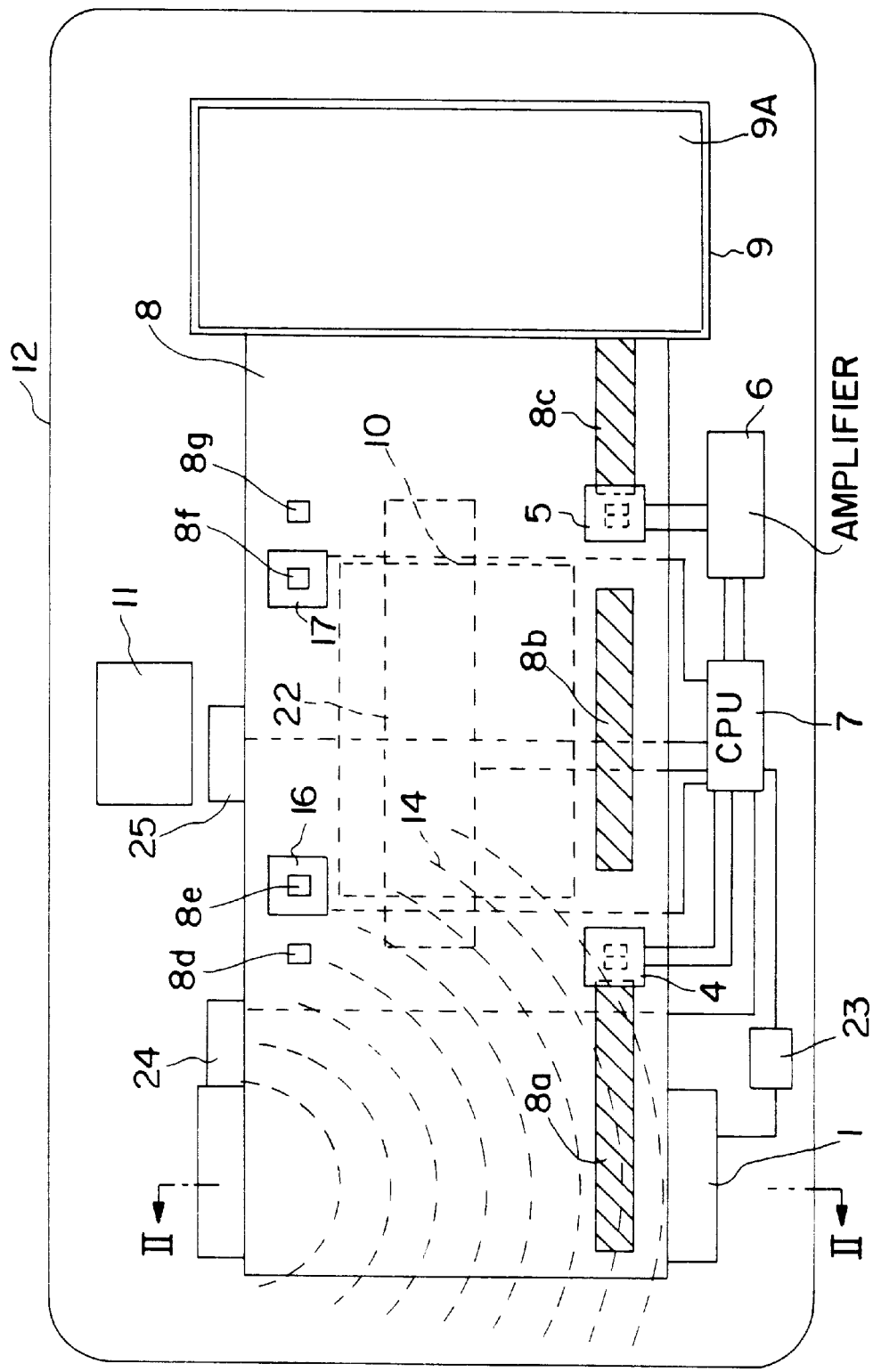
FIG. 1 is a rear view of a camera housing a windup spool and a drive motor according to a preferred embodiment of the present invention.

Reference will now be made in detail to the preferred embodiments of the present invention, examples of which are illustrated in the accompanying drawings, wherein like reference numerals refer to like elements throughout.

Figure 2:
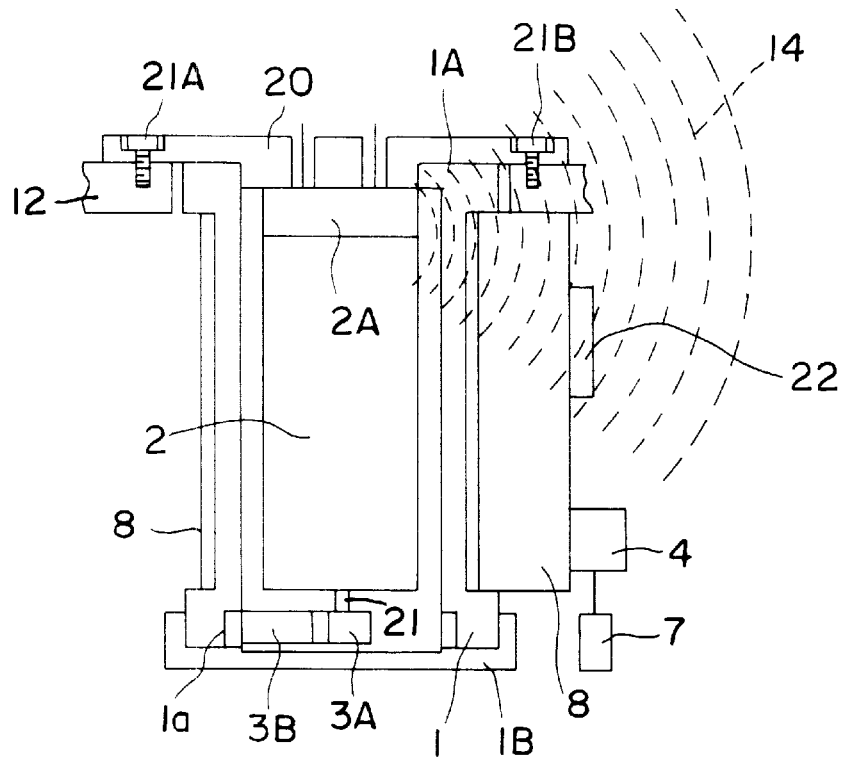
FIG. 2 is a cross sectional view of the camera taken along line II–II of FIG. 1.

FIG. 1 is a rear view of a camera with a camera body 12 housing a windup spool 1 according to a preferred embodiment of the present invention. FIG. 2 is a sectional view of windup spool 1 taken along line II–II of FIG. 1. As illustrated, film cartridge 9A houses photographic film 8 which includes magnetic recording regions 8a, 8b, and 8c. In camera body 12, windup spool 1 winds the film 8 during extraction from cartridge 9A. Picture frame 10, which outlines a picture area of photographic film 8, is located between the windup spool 1 and cartridge 9A. Viewfinder 11 is disposed within camera body 12 above picture frame 10.

Figure 4:
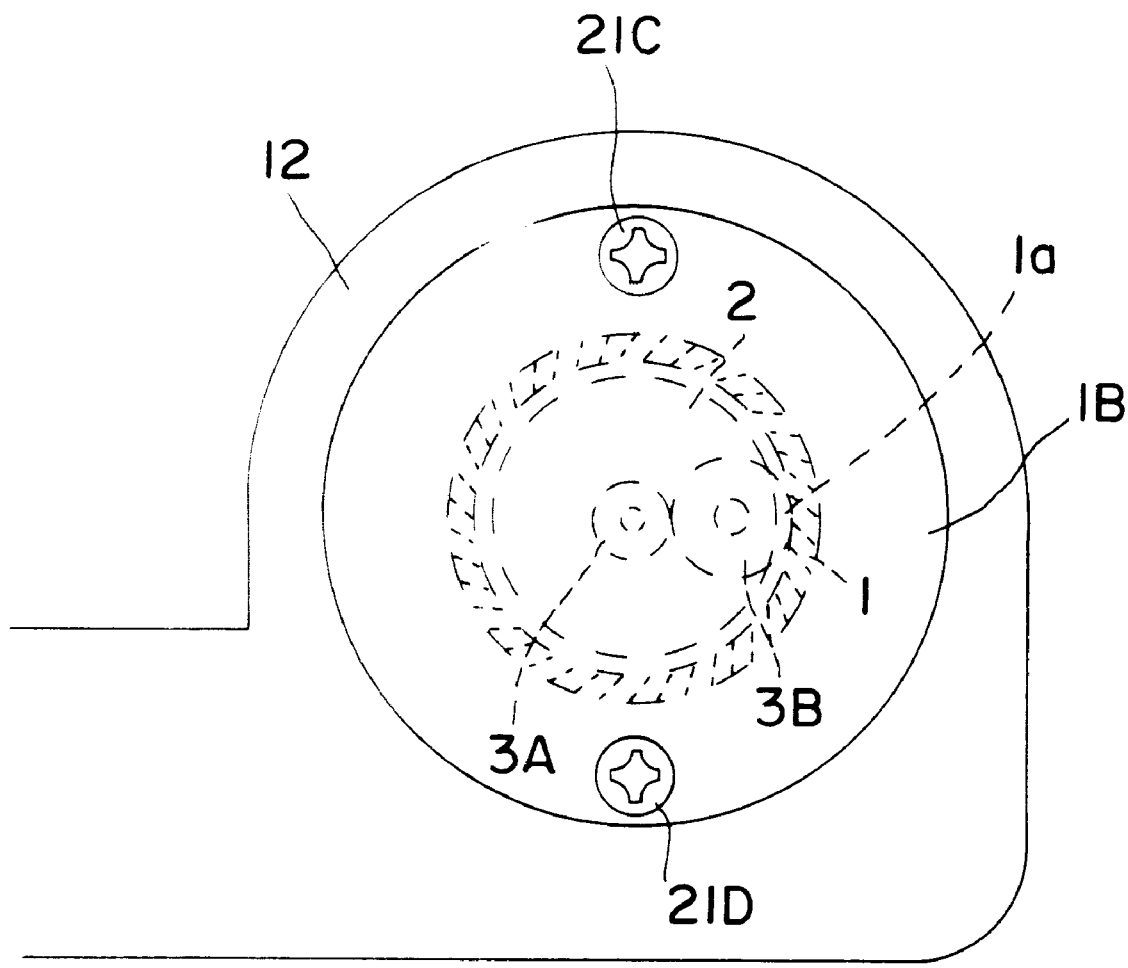
FIG. 4 is a bottom view of the windup spool and drive motor of the camera of FIG. 1.

Windup spool 1, as illustrated in FIG. 2, includes a tubular portion 1A onto which photographic film 8 is wound, and a back portion 1B. Back portion 1B is affixed to camera body 12 by screws 21C, 21D, as illustrated in FIG. 4. Drive motor 2 induces rotation of tubular portion 1A in response to a signal from motor driver 23. As illustrated in FIG. 2, brush portion 2A of drive motor 2 is located on an upper side of camera body 12 within tubular portion 1A and is affixed to camera body 12 by motor fixing member 20. Motor fixing member 20 itself is affixed to camera body 12 by way of screws 21A, 21B.

Tubular portion 1A is rotatably supported by back portion 1B and motor fixing member 20. Pinion gear 3A is integrally pressed onto drive shaft 21 of drive motor 2 and is also in engagement with reduction gear 3B. Reduction gear 3B transmits force from drive motor 2 to tubular portion 1A through engagement with gear portion 1a. Gear portion 1a is formed within tubular portion 1A. Through the above linkage, rotation of drive motor 2 induces rotation in windup spool 1. Furthermore, to reduce the leakage of magnetic flux 14 from drive motor 2, tubular portion 1A, back portion 1B and motor fixing member 20 are molded with magnetic shielding resin material which contains magnetic shielding fibers.

As illustrated in FIG. 1, writing head 4, which writes magnetic data in magnetic recording regions 8a, 8b, 8c of photographic film 8, is located between windup spool 1 and picture frame 10. On the other hand, readout head 5, which reads out magnetic data from magnetic recording regions 8a, 8b, 8c of film 8, is located between cartridge compartment 9 and picture frame 10.

Amplifier 6 amplifies magnetic data read out by readout head 5 and is located below readout head 5. In order to maintain the transparency of film 8, the thickness of magnetic recording regions 8a, 8b, and 8c coated onto the surface of photographic film 8 is thin in comparison with audio tape or video tape. The thickness of magnetic recording regions 8a, 8b, and 8c is about 1/50–1/100 in comparison with the above-mentioned audio tape or video tape. Amplifier 6 is set at a gain which amplifies the magnetic data read from magnetic recording regions 8a–8c about 50–100 times.

A liquid crystal display 22 to display photographic conditions is located rearward, i.e. toward the back, of picture frame 10 within camera body 12. DC/DC converter 24, which steps up a voltage supplied to a flash device such as a strobe light, etc. (not shown), is located above film 8 and in close proximity to windup spool 1. In addition, photometric and rangefinding device 25, which performs rangefinding and photometry of a subject, is located above picture frame 10. A number of perforations 8d–8g are formed in photographic film 8 in order to set intervals for the picture frames of photographic film 8. Photoreflectors 16, 17 are located above the path of photographic film 8 between cartridge compartment 9 and windup spool 1 to detect the positions of perforations 8d–8g. Writing head 4, readout head 5, amplifier 6, liquid crystal display 22, motor driver 23, DC/DC converter 24, photometric and rangefinding device 25 and photoreflectors 16, 17 are all connected to the CPU 7, which is located below the path of photographic film 8. Viewfinder 11 is located above the path of photographic film 8.

During camera operation according to a preferred embodiment of the present invention, after photography has been performed, photographic film 8 is wound up by rotating windup spool 1 by drive motor 2. During windup of the photographic film 8, photographic information such as the time and date of photography, trimming data, and the like is recorded within a corresponding magnetic recording region by writing head 4.

Figure 3:
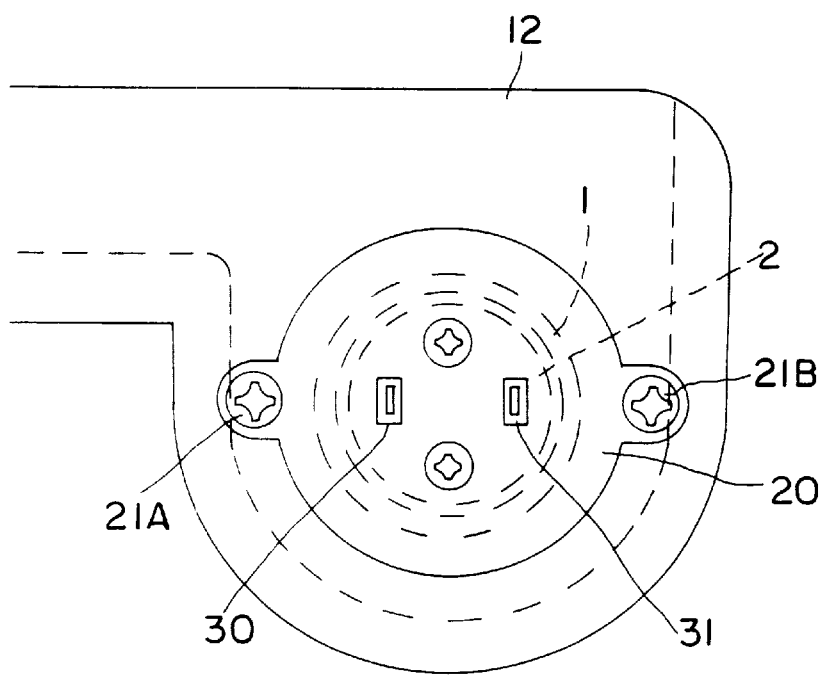
FIG. 3 is a top view of the windup spool and drive motor of the camera of FIG. 1.

Because a material having a high magnetic permeability, such as metal, is used in the casing of drive motor 2, the leakage of magnetic flux is very small. However, the cap portion on the brush side of drive motor 2, as illustrated in FIG. 3, is preferably made from insulating material to insulate electrical terminals 30, 31. Plastic is frequently used as the insulating material and this allows the leakage of magnetic flux to be large. According to the present preferred embodiment, the brush side of drive motor 2 is located in an upward position within camera body 12 and readout head 5 is located in a downward position within camera body 12 between cartridge compartment 9 and picture frame 10. Thus, readout head 5 is located in a position which is far away from the brush side of the drive motor 2.

Moreover, windup spool 1 is made from magnetic shielding resin material. Because of this, noise which is due to leakage of magnetic flux from the brush side of drive motor 2 is suppressed from mixing with the magnetic data which is read out from readout head 5. Moreover, amplifier 6 is disposed in a position remote from the brush side of drive motor 2. Thus, even when the magnetic data which has been read out from readout head 5 is amplified by amplifier 6, the mixing of noise with the magnetic data being amplified by amplifier 6 is suppressed. Moreover, because the space of windup spool 1 is somewhat enclosed by back unit 1B and motor fixing member 20, the use of materials having a high shielding effect may further suppress the leakage of magnetic flux from the brush side of drive motor 2 to the exterior of windup spool 1.

Photographic film 8 may be loaded and reloaded into camera body 12 during operation. Accordingly, a case arises in which photographic film having frames which have been partially exposed is reloaded into the camera. Thus, it becomes necessary to forward the photographic film until an unexposed frame is reached. During this operation, magnetic recording regions 8a–8c are pulled from film cartridge 9A, move past readout head 5, and then reach the picture frame 10. Because magnetic data is recorded in each magnetic recording region in which frames have been exposed, the photographic film 8 is forwarded until a magnetic recording region having no recorded magnetic data is detected. In such a case, when readout head 5 is located between picture frame 10 and windup spool 1, it becomes necessary to adjust the unexposed frame with respect to picture frame 10 after detection of the unexposed frame. This is accomplished by forwarding the photographic film 8 in a reverse direction.

However, according to the present preferred embodiment, readout head 5 is located between cartridge compartment 9 and picture frame 10, such that the photographic film 8 can immediately be in a position for exposure without advancing the film in a reverse direction after detection of an unexposed frame.

Furthermore, in the present preferred embodiment, amplifier 6 located below readout head 5, can perform amplification of the magnetic data without being affected by leakage of magnetic flux 14 from drive motor 2.

Moreover, because CPU 7 is located below the path of photographic film 8, the leads connecting CPU 7 to amplifier 6 and writing head 4 do not traverse the liquid crystal display 22. Thus, noise generated by electromagnetic waves from liquid crystal display 22 are not mixed into the magnetic data written to photographic film 8 from writing head 4. Further, mixing of the electromagnetic waves from the liquid crystal display 22 and the magnetic data read out by readout head 5 is suppressed.

The DC/DC converter 24 is located upward from the path of photographic film 8 to be close to windup spool 1. The readout head 5 and amplifier 6 are thus located in positions remote from DC/DC converter 24. Accordingly, the leakage of magnetic flux from DC/DC converter 24 which affects readout head 5 and amplifier 6 becomes small, and the mixing of noise into the magnetic data read out from readout head 5 is suppressed.

According to a preferred embodiment of the present invention, writing head 4 is located between picture frame 10 and windup spool 1. However, writing head 4 may be located in other positions.

Figure 5:
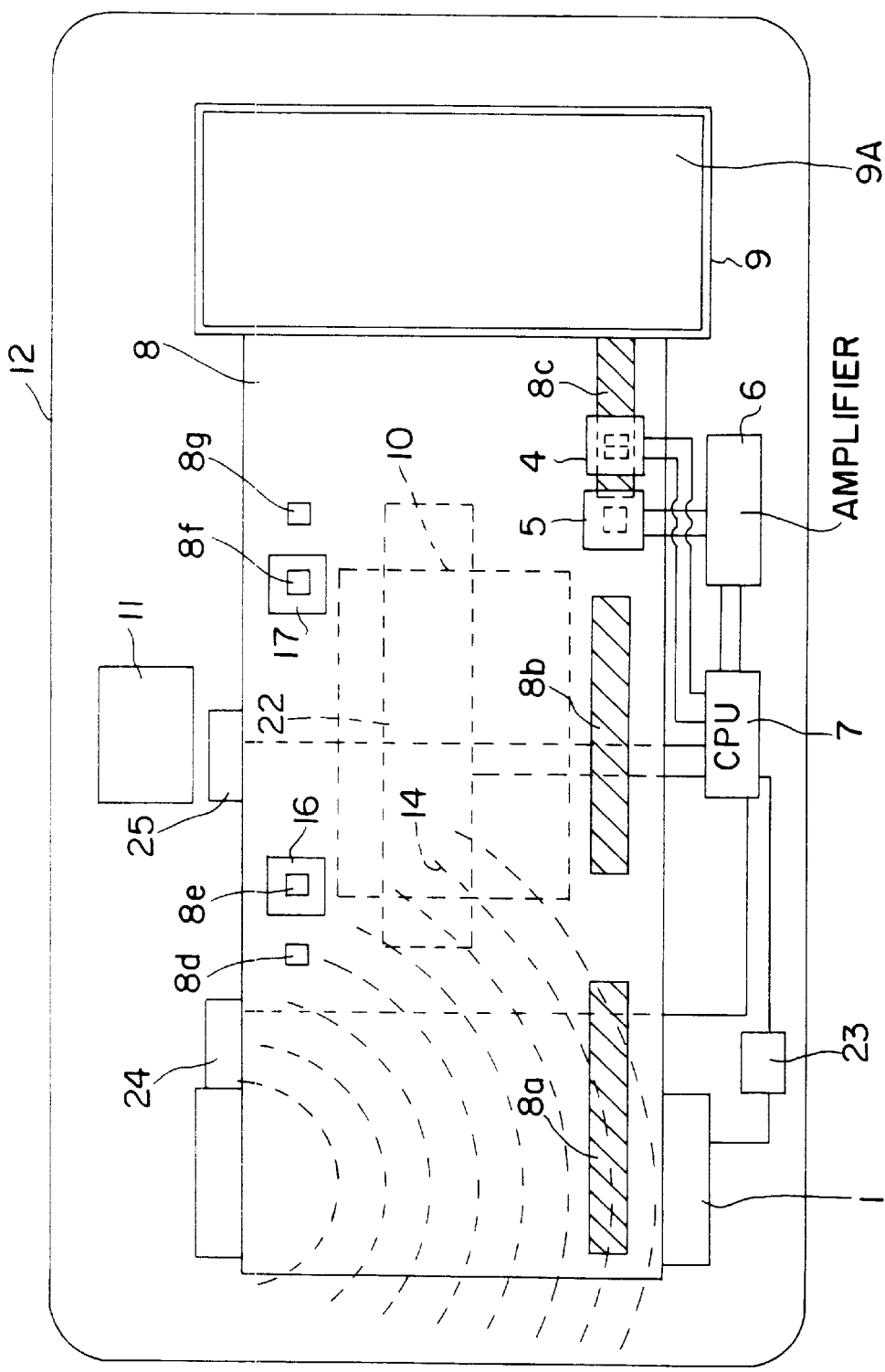
FIG. 5 is rear view of a camera housing a windup spool and drive motor according to a second preferred embodiment of the present invention.

According to a second preferred embodiment of the present invention, writing head 4 may be located close to readout head 5, as illustrated in FIG. 5.

Figure 6:
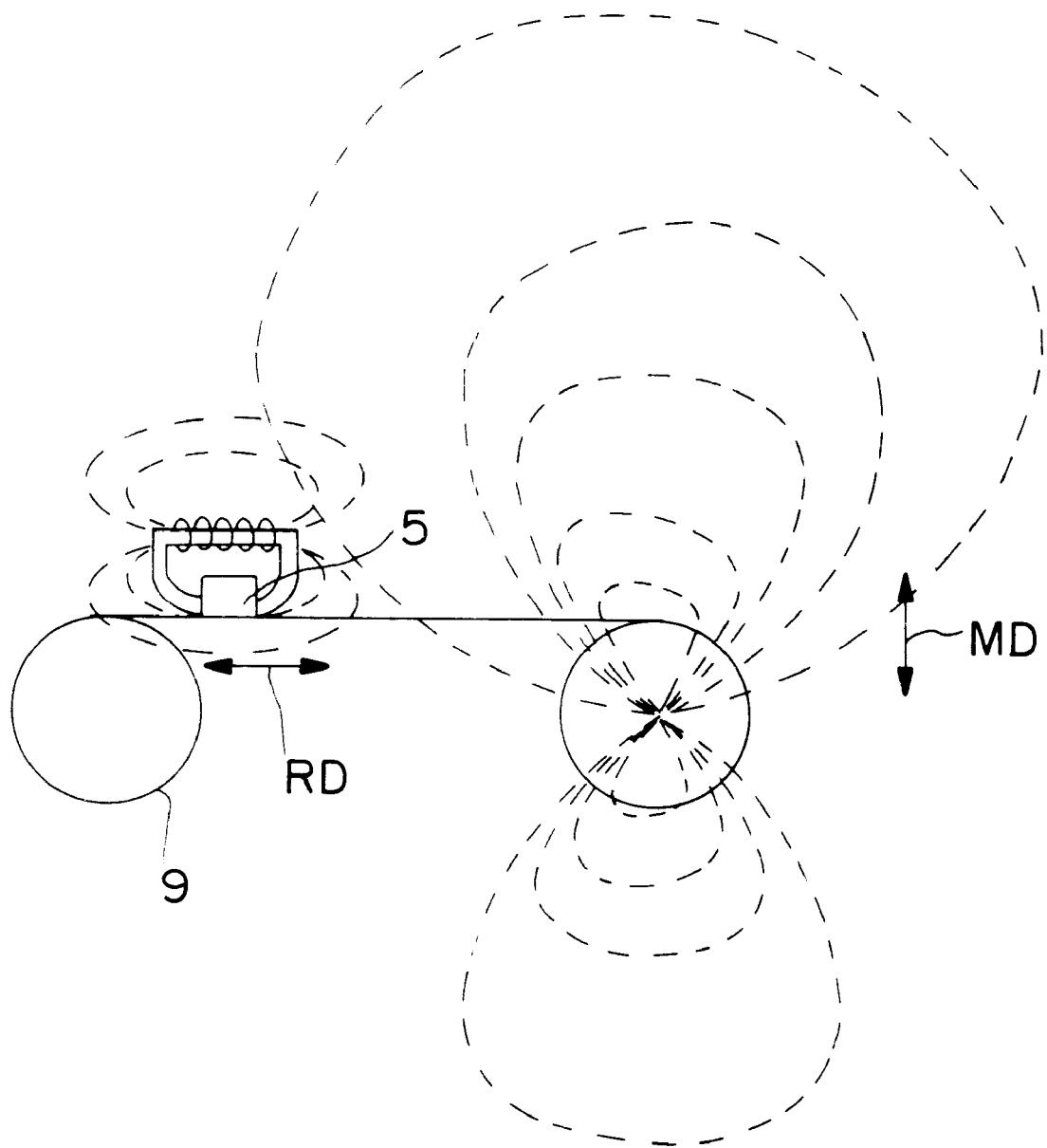
FIG. 6 is a schematic view of magnetic flux lines generated from a drive motor of a camera.

The leakage of magnetic flux generated from a brush side of drive motor 2 diffuses in a pattern as illustrated in FIG. 6. FIG. 6 illustrates the up and down directions of the magnetic flux lines. Accordingly, the direction RD of the magnetic flux of the readout head 5 does not coincide with the direction MD of these magnetic flux lines. Namely, the effects of the leakage of magnetic flux can be greatly reduced by locating readout head 5 so that it is different.

According to a preferred embodiment of the present invention, readout head 5 is a magnetic data readout means, writing head 4 is a magnetic data recording means, and liquid crystal display 22 is a liquid crystal display means.

Figure 7:
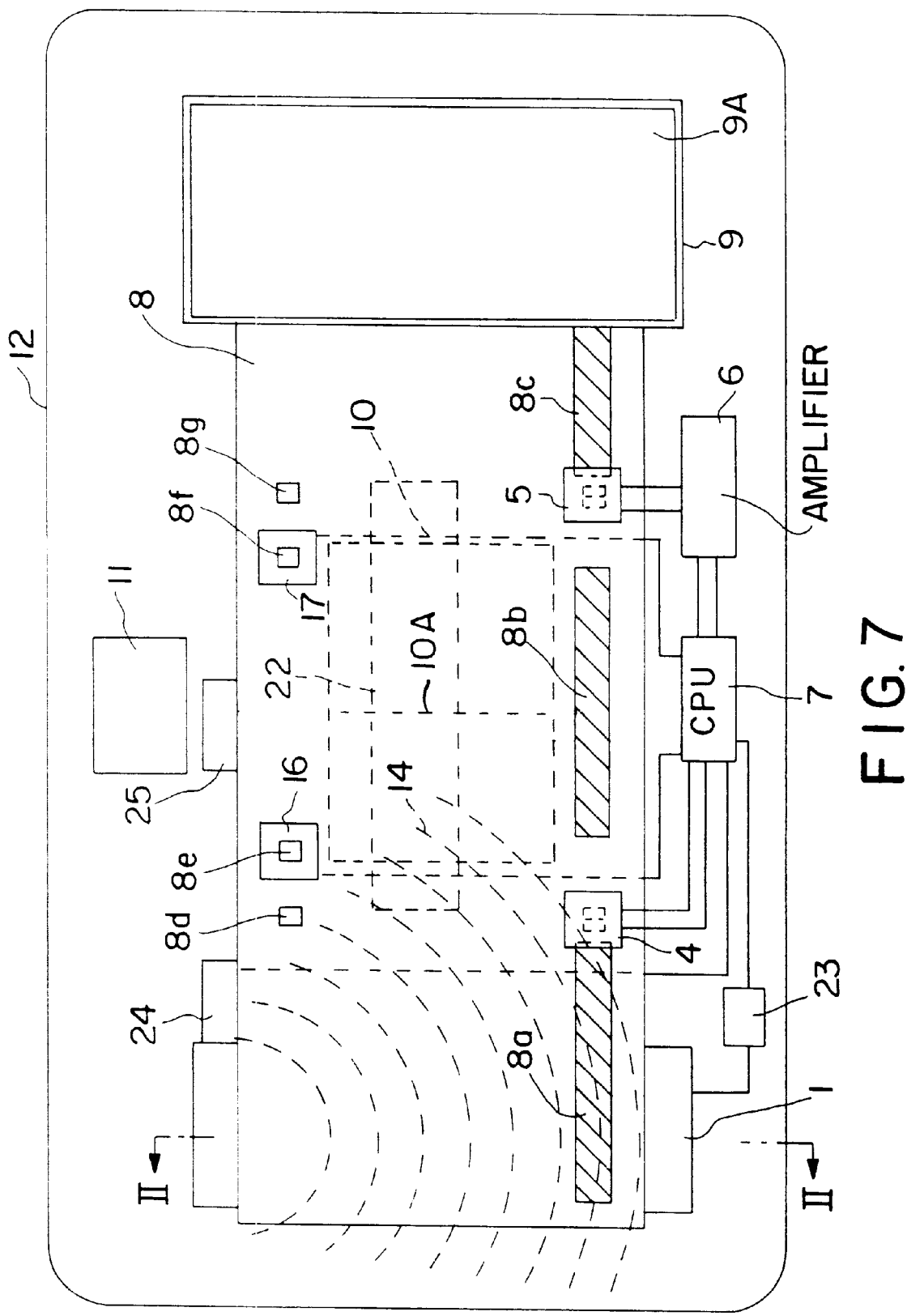
FIG. 7 is rear view of a camera having a picture frame with a vertical axis.

FIG. 7 is substantially similar to FIG. 1 and therefore the description of duplicate items has been suitably omitted. FIG. 7 illustrates vertical axis 10A which vertically bisects picture frame 10. The noise emitted from DC/DC converter 24 and brush portion 2A of drive motor 2 (contained within windup spool 1) are suppressed through location of readout head 5 on an opposite side with respect to the vertical axis 10A of picture frame 10.

Although a few preferred embodiments of the present invention have been shown and described, it will be appreciated by those skilled in the art that changes may be made in these embodiments without departing from the principles and spirit of the invention, the scope of which is defined in the claims and their equivalents.

What is claimed is:

1. A camera, comprising:
    a cartridge compartment to receive a photographic film cartridge housing magnetically recordable photographic film;
    a windup spool to wind up the photographic film;
    a drive motor disposed within the windup spool and providing drive to said windup spool;
    a picture frame to define an exposed portion of the photographic film and disposed between said cartridge compartment and said windup spool;
    a magnetic head to read out magnetic data which has been recorded on the photographic film, said magnetic head being disposed on an opposite side of said picture frame from said windup spool;
    a liquid crystal display to display photographic data and overlapping said picture frame along a horizontal plane;
    a CPU connected to said magnetic head; and
    electrical leads connecting said CPU to said magnetic head,
    wherein the electrical leads are disposed below said picture frame to thereby be in a position remote from said liquid crystal display.

2. A camera to expose photographic film and communicate photographic data with a magnetic storage region of the photographic film, comprising:
    a DC/DC converter to step up voltage within the camera, wherein said DC/DC converter emits magnetic flux during operation;
    a picture frame to define an exposed portion of the photographic film;
    a magnetic head to read out magnetic data which has been recorded in the magnetic storage region of the photographic film, wherein said magnetic head is disposed on an opposite side of said picture frame from said DC/DC converter;

a liquid crystal display to display photographic data and overlapping said picture frame along a horizontal plane;

a CPU connected to said magnetic head; and an electrical connector connecting said CPU to said magnetic head, wherein the electrical connector is disposed in a position remote from said liquid crystal display.

3. The camera according to claim 2, further comprising:

an amplifier to amplify the magnetic data which has been read out of said magnetic head, wherein the amplifier is disposed on an opposite side of said picture frame from said DC/DC converter.

4. The camera according to claim 2, further comprising:

a second magnetic head to record magnetic data o n the photographic film, wherein said second magnetic head is disposed on an opposite side of said picture frame from said DC/DC converter.

5. The camera according to claim 4, wherein said second magnetic head is disposed adjacent to said magnetic head to read out magnetic data.

6. The camera according to claim 4, further comprising:

a drive motor disposed within the windup spool and providing drive to said windup spool, wherein said drive motor is disposed adjacent to said DC/DC converter.

7. The camera according to claim 6, wherein said drive motor has a brush side which emits magnetic flux; and said magnetic head is disposed on an opposite side of said photographic film from the brush side of said drive motor.

8. A camera to expose photographic film and communicate photographic data with a magnetic storage region of the photographic film, comprising:

a DC/DC converter to step up voltage within the camera, wherein said DC/DC converter emits magnetic flux during operation;

a windup spool molded with resin which contains magnetic shielding fibers to wind up the photographic film;

a picture frame to expose the photographic film, wherein the picture frame has a vertical axis; and a magnetic head to read out magnetic data which has been recorded in the magnetic storage region of the photographic film, wherein said magnetic head is disposed on an opposite side of the vertical axis of said picture frame from said DC/DC converter.

9. A camera, comprising:

a compartment to receive magnetically recordable photographic film;

a windup spool molded with resin which contains magnetic shielding fibers to wind up the photographic film;

a drive motor having a brush side and disposed within the windup spool to drive said windup spool;

a picture frame to define an exposed portion of the photographic film and disposed between said compartment and said windup spool;

a magnetic head to read out magnetic data which has been recorded on the photographic film;

an amplifier to amplify the magnetic data which has been read out of said magnetic head and disposed on an opposite side of said picture frame from said windup spool; and a DC/DC converter to step up voltage within the camera, wherein said DC/DC converter is disposed adjacent to the brush side of said drive motor, wherein said magnetic head is disposed on an opposite side of said picture frame from said windup spool.

10. A camera, comprising:

a compartment to receive magnetically recordable photographic film;

a windup spool to wind up the photographic film;

a drive motor having a brush side and disposed within the windup spool to drive said windup spool;

a picture frame to define an exposed portion of the photographic film and disposed between said compartment and said windup spool;

a magnetic head to read out magnetic data which has been recorded on the photographic film, said magnetic head being disposed on an opposite side of said picture frame from said windup spool;

a CPU connected to said magnetic head;

an amplifier to amplify the magnetic data which has been read out of said magnetic head and disposed on an opposite side of said picture frame from said windup spool;

a DC/DC converter to step up voltage within the camera, wherein said DC/DC converter is disposed adjacent to the brush side of said drive motor;

a liquid crystal display to display photographic data and overlapping said picture frame along a horizontal plane; and electrical leads connecting said CPU to said magnetic head, said electrical leads being disposed below said picture frame to thereby be in a position remote from said liquid crystal display.

11. The camera according to claim 10, further comprising:

a second magnetic head to record magnetic data on the photographic film, wherein said second magnetic head is disposed on an opposite side of said picture frame from said windup spool.

12. A camera, comprising:

a cartridge compartment to receive a photographic film cartridge housing magnetically recordable photographic film;

a windup spool to wind up the photographic film;

a drive motor disposed within the windup spool and providing drive to said windup spool;

a picture frame to define an exposed portion of the photographic film and disposed between said cartridge compartment and said windup spool;

a magnetic head to read out magnetic data which has been recorded on the photographic film, said magnetic head being disposed on an opposite side of said picture frame from said windup spool;

a liquid crystal display to display photographic data and overlapping said picture frame along a horizontal plane;

a CPU connected to said magnetic head; and an electrical connector connecting said CPU to said magnetic head, wherein the electrical connector is disposed in a position remote from said liquid crystal display.

13. A camera to expose photographic film and communicate photographic data with a magnetic storage region of the photographic film, comprising:

a DC/DC converter to step up voltage within the camera, wherein said DC/DC converter emits magnetic flux during operation;

a windup spool, having a magnetic shielding effect, to wind up the photographic film;

a picture frame to expose the photographic film, wherein the picture frame has a vertical axis; and a magnetic head to read out magnetic data which has been recorded in the magnetic storage region of the photographic film, wherein said magnetic head is disposed on an opposite side of the vertical axis of said picture frame from said DC/DC converter.

14. A camera, comprising:

a compartment to receive magnetically recordable photographic film;

a windup spool, having a magnetic shielding effect, to wind up the photographic film;

a drive motor having a brush side and disposed within the windup spool to drive said windup spool;

a picture frame to define an exposed portion of the photographic film and disposed between said compartment and said windup spool;

a magnetic head to read out magnetic data which has been recorded on the photographic film;

an amplifier to amplify the magnetic data which has been read out of said magnetic head and disposed on an opposite side of said picture frame from said windup spool; and a DC/DC converter to step up voltage within the camera, wherein said DC/DC converter is disposed adjacent to the brush side of said drive motor, wherein said magnetic head is disposed on an opposite side of said picture frame from said windup spool.

15. A camera, comprising:

a compartment to receive magnetically recordable photographic film;

a windup spool to wind up the photographic film;

a drive motor having a brush side and disposed within the windup spool to drive said windup spool;

a picture frame to define an exposed portion of the photographic film and disposed between said compartment and said windup spool;

a magnetic head to read out magnetic data which has been recorded on the photographic film, said magnetic head being disposed on an opposite side of said picture frame from said windup spool;

a CPU connected to said magnetic head;

an amplifier to amplify the magnetic data which has been read out of said magnetic head and disposed on an opposite side of said picture frame from said windup spool;

a DC/DC converter to step up voltage within the camera, wherein said DC/DC converter is disposed adjacent to the brush side of said drive motor;

a liquid crystal display to display photographic data and overlapping said picture frame along a horizontal plane; and an electrical connector connecting said CPU to said magnetic head, said electrical connector being disposed in a position remote from said liquid crystal display.

* * * * *